(12) United States Patent
Ross

(10) Patent No.: US 10,986,119 B2
(45) Date of Patent: *Apr. 20, 2021

(54) IMPLEMENTATION COMPARISON-BASED SECURITY SYSTEM

(71) Applicant: Curtail, Inc., Anaheim, CA (US)

(72) Inventor: Robert F. Ross, Santa Ana, CA (US)

(73) Assignee: Curtail, Inc., Anaheim, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/543,412

(22) Filed: Aug. 16, 2019

(65) Prior Publication Data

US 2020/0007573 A1   Jan. 2, 2020

Related U.S. Application Data

(63) Continuation of application No. 15/251,472, filed on Aug. 30, 2016, now Pat. No. 10,432,659.

(60) Provisional application No. 62/217,652, filed on Sep. 11, 2015.

(51) Int. Cl.
*H04L 29/06* (2006.01)
*G06F 21/57* (2013.01)

(52) U.S. Cl.
CPC ...... *H04L 63/1441* (2013.01); *H04L 63/1433* (2013.01); *G06F 21/577* (2013.01); *H04L 63/1416* (2013.01)

(58) Field of Classification Search
CPC ............. H04L 63/1441; H04L 63/1433; H04L 63/1416; G06F 21/577
USPC ........................................................ 726/23
See application file for complete search history.

(56) References Cited

U.S. PATENT DOCUMENTS

| | | |
|---|---|---|
| 6,308,217 B1 | 10/2001 | Sasagawa |
| 6,889,218 B1 | 5/2005 | Nassehi |
| 6,996,817 B2 | 2/2006 | Birum |
| 7,523,494 B2 | 4/2009 | Himberger |
| 8,352,870 B2 | 1/2013 | Bailor |
| 8,407,670 B2 | 3/2013 | Hegde |
| 8,505,027 B2 | 8/2013 | Warner |
| 8,528,077 B1 | 9/2013 | Tidwell |
| 8,560,344 B2 | 10/2013 | Earles |

(Continued)

FOREIGN PATENT DOCUMENTS

| | | |
|---|---|---|
| EP | 1059578 | 12/2000 |
| WO | 2011139176 | 11/2011 |

(Continued)

OTHER PUBLICATIONS

Hu et al., "A Simple and Efficient Hidden Markov Model Scheme for Host-Based Anomaly Intrusion Detection", IEEE Network, IEEE Service Center, New York, NY, US, vol. 23, No. 1, Jan. 1, 2009, pp. 42-47. XP011254059, ISSN: 0890-8044.

(Continued)

*Primary Examiner* — Mohammad W Reza
(74) *Attorney, Agent, or Firm* — Van Pelt, Yi & James LLP

(57) ABSTRACT

An implementation comparison-based security system is disclosed. In various embodiments, respective network messages received from a plurality of implementations are received. The network messages are compared to determine whether any network message in the received set of network messages deviates from any one or more other network messages in the set. A responsive action is determined based at least in part on the results of said comparison.

18 Claims, 11 Drawing Sheets

(56) References Cited

U.S. PATENT DOCUMENTS

| | | |
|---|---|---|
| 8,726,387 B2 | 5/2014 | Ståhlberg |
| 9,124,640 B2 | 9/2015 | Sweet |
| 9,407,652 B1 | 8/2016 | Kesin |
| 9,454,726 B1 | 9/2016 | Yao |
| 9,590,854 B1 | 3/2017 | Shekhar |
| 2002/0057687 A1 | 5/2002 | Birkenmaier |
| 2004/0098617 A1* | 5/2004 | Sekar ............. H04L 43/00 726/4 |
| 2006/0271885 A1 | 11/2006 | Pittendrigh |
| 2008/0126277 A1 | 5/2008 | Williams |
| 2009/0249129 A1* | 10/2009 | Femia ............. G06F 11/3447 714/47.2 |
| 2009/0271343 A1 | 10/2009 | Vaiciulis |
| 2010/0057510 A1 | 3/2010 | Stevens |
| 2010/0325685 A1 | 12/2010 | Sanbower |
| 2011/0096999 A1 | 4/2011 | Willis |
| 2012/0188087 A1 | 7/2012 | Wang |
| 2012/0215491 A1 | 8/2012 | Theriot |
| 2012/0297484 A1* | 11/2012 | Srivastava ........ G06F 21/552 726/23 |
| 2013/0097701 A1 | 4/2013 | Moyle |
| 2014/0122325 A1 | 5/2014 | Zoldi |
| 2014/0143873 A1 | 5/2014 | Stirtzinger |
| 2014/0164416 A1 | 6/2014 | Hosseini |
| 2014/0279736 A1 | 9/2014 | Glass |
| 2014/0280550 A1 | 9/2014 | Glass |
| 2014/0280890 A1 | 9/2014 | Yi |
| 2014/0282964 A1 | 9/2014 | Stubblefield |
| 2015/0039749 A1 | 2/2015 | Kwan |
| 2015/0046405 A1 | 2/2015 | Brueckner |
| 2015/0082428 A1 | 3/2015 | Dokey |
| 2015/0101053 A1 | 4/2015 | Sipple |
| 2015/0121518 A1 | 4/2015 | Shmueli |
| 2015/0180893 A1 | 6/2015 | Im |
| 2015/0324563 A1 | 11/2015 | Deutschmann |
| 2015/0358344 A1 | 12/2015 | Mumcuoglu |
| 2015/0363791 A1 | 12/2015 | Raz |
| 2016/0253688 A1 | 9/2016 | Nielsen |
| 2016/0373477 A1 | 12/2016 | Moyle |
| 2017/0013110 A1 | 1/2017 | Sato |
| 2017/0228657 A1 | 8/2017 | Kinnier |

FOREIGN PATENT DOCUMENTS

| | | |
|---|---|---|
| WO | 2015004543 | 1/2015 |
| WO | 2017062972 | 4/2017 |

OTHER PUBLICATIONS

@pzdk. Diffy: Testing Services Without Writing Tests. Sep. 3, 2015: https://blog.twitter.com/engineering/en_us/a/2015/diffy-testing-services-without-writing-tests.html.

Nagy et al. Fit Computer Science Technical Report: CS-2006-04. "N-Version Programming for the Detection of Zero-day Exploits". Invited paper, presented at: The IEEE Topical Conference on Cybersecurity, Daytona Beach, FL, Apr. 2006.

Vishwanathan et al. Graph Kernels. Journal of Machine Learning Research 11 (20210) 1201-1242. Submitted May 2008; Revised Apr. 2009; Published Apr. 2010.

* cited by examiner

IMPLEMENTATION COMPARISON-BASED SECURITY SYSTEM

CROSS REFERENCE TO OTHER APPLICATIONS

This application is a continuation of co-pending U.S. patent application Ser. No. 15/251,472 entitled IMPLEMENTATION COMPARISON-BASED SECURITY SYSTEM filed Aug. 30, 2016, which claims priority to U.S. Provisional Patent Application No. 62/217,652 entitled IMPLEMENTATION COMPARISON-BASED SECURITY SYSTEM filed Sep. 11, 2015, both of which are incorporated herein by reference for all purposes.

BACKGROUND OF THE INVENTION

Security vulnerabilities tend to be program behaviors that are not desired or anticipated by the users of the program. This means that in many cases either the vulnerability is due to an error or oversight on the part of the developer, or that a malicious developer intentionally introduced code to cause the behavior. Every service that is deployed is potentially vulnerable in ways that may not have been discovered yet.

Many services have multiple open source implementations available and even more closed source options. Often, these independent implementations represent distinct groups of developers creating a service based on protocol or interface specifications. Because of this diversity, an administrator often has a choice of implementations when choosing to provide a service. Choosing a particular version of a particular piece of software and regularly reviewing and updating that choice is a standard aspect of security practice. This ongoing choice is driven in part by the regular discovery of new vulnerabilities which usually affect certain versions of certain software packages. Using a different version of the software or a different software package is thus one way to remove a vulnerability after it has become known.

BRIEF DESCRIPTION OF THE DRAWINGS

Various embodiments of the invention are disclosed in the following detailed description and the accompanying drawings.

DETAILED DESCRIPTION

Figure 1:
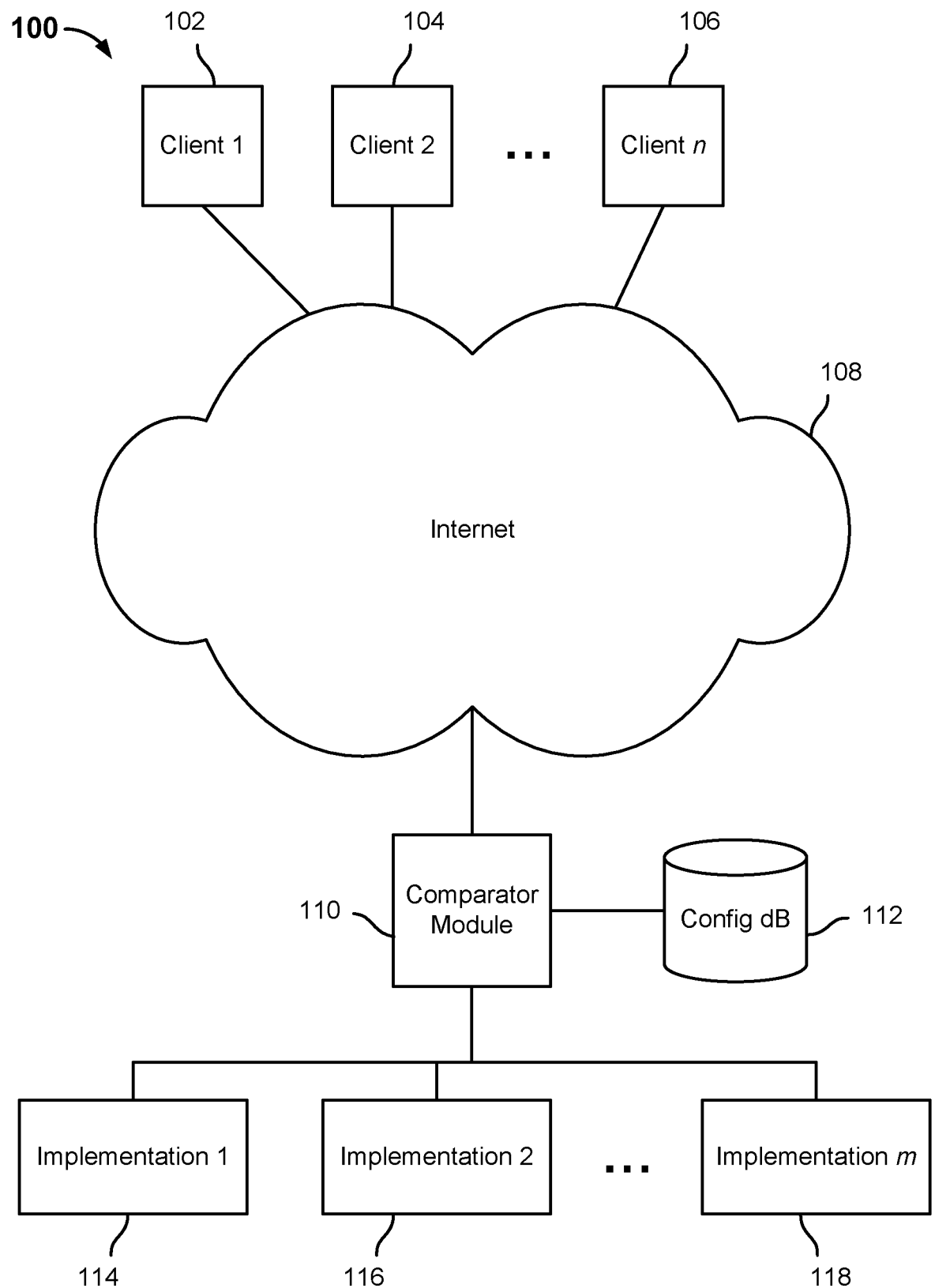
FIG. 1 is a block diagram illustrating an embodiment of a system and environment to provide implementation comparison-based security.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to detect attacks, e.g., to minimize vulnerability windows as well as to identify and contain attackers, are disclosed. In various embodiments, a variety of implementations available are evaluated and their behaviors are compared. The tendency of vulnerabilities to be limited to particular software packages and particular ranges of versions creates a situation where vulnerable behaviors will be identifiable as being significantly different from the behavior of their peers. In various embodiments, an automated mechanism, e.g., a security tool, is provided and used to identify (e.g., observe or otherwise determine) these differences and initiate appropriate response(s). Responsive actions may include selecting in real time a correct or valid response to be provided to a user and/or a correct or valid output to be used to update a destination resource, such as a file server, a database, etc. Behavior that deviates from peer behavior may be identified as anomalous behavior. Such anomalous behavior may trigger one or more responses, such as notifications and alerts, blocking an implementation from use, etc.

FIG. 1 is a block diagram illustrating an embodiment of a system and environment to provide implementation comparison-based security. In the example shown, computing environment 100 includes a plurality of clients 1 through n, represented in FIG. 1 by clients 102, 104, and 106. Clients 102, 104, and 106 are connective via the Internet 108 and/or one or more other networks to a comparator module 110. In various embodiments, comparator module 110 may include one or more software modules running on a general purpose computer, such as a server. Comparator module 110 may be configured to respond to requests received via the Internet 108 from clients, such as clients 102, 104, and 106, in a manner determined at least in part based on configuration data stored in a configuration database 112. In the example shown, comparator module 110 may be configured to respond to each client request by forwarding a copy of the same request to each of a prescribed number of implementations of an application, service, or other software or hardware provided functionality with which the request is associated. The implementations to which a particular request may be sent may include a subset of implementations selected from an available pool of implementations 1 through m, represented in FIG. 1 by implementation 114, 116, and 118. Examples of an implementation include, without limitation, different instances of a same version of an application or service; different versions, patch levels, etc. of a same application or service; different hardware and/or software platforms on which an application or service may be run; etc.

In various embodiments, comparator module 110 may be configured to receive from each implementation to which a given request has been sent a corresponding response generated by that implementation in response to the request. The comparator 110 compares the responses. In some embodiments, if all the responses are the same one of them is selected (e.g., at random, based on implementation IP or other address, etc.) to be sent to the requesting client. In various embodiments, if the comparison reveals that the responses are not all the same, the comparator module 110 takes responsive action, e.g., as configured per configuration database 112. Examples of responsive action may include, without limitation, selecting a correct or otherwise valid response to send to the requesting client; generating an alert, notification, or other communication or report; blocking access to and/or further use of an implementation that provided a response that did not match the response provide by its peers; etc.

In various embodiments, one or more forms of comparison may be made between implementations. In some embodiments, these forms of comparison may include one or more of the following: static analysis of the implementations, host-based behavioral comparison, raw comparison of traffic, semantic comparison of traffic, semantic comparison over protocol stacks, and comparison where the comparator must participate in the protocol, such as when cryptographic portions of a protocol require the comparator to engage in cryptographic actions itself in order to decrypt and compare encoded data.

Comparisons may be made with any number of implementations. When two implementations are used, it is only possible to identify that there is a difference. When three or more implementations are used, it is possible to distinguish between behavior that represents the statistical mode from outlier behavior. If outlier behavior is identified, it can be expected that vulnerabilities will manifest as outliers more often than as the statistical mode.

In various embodiments, depending on the preferences of the administrator, consumers of the service may be presented with outlier behavior, mode behavior, only unanimous behavior, an arbitrary selection among the implementation behaviors, or a replacement behavior not necessarily observed.

Static comparison may be performed using code analysis tools to analyze either the source code or the compiled code for various implementations. Static analysis may involve the formation of call graphs and analysis of the flow of data through code execution. This is commonly used as a way of analyzing a single program in isolation in order to better understand its behavior or in order to discover vulnerabilities. However, in various embodiments, the call graphs and data flow information for multiple independent implementations may be compared. In some embodiments, in cases where a static analysis tool can prove that the response to a user action differs between three different implementations, the difference may be considered to indicate an actual or potential vulnerability. In some cases, static analysis tools may not be able to prove different behaviors but may still have useful findings. For example, if a static analysis tool may be able to prove that one implementation is compliant but may be unable to form a proof regarding the behavior of another implementation, then it may be determined that the latter implementation has undefined behavior which may be indicative of a security flaw. This may be particularly true when the behavior in question is mandated by a standard and only one implementation deviates from the behavior of the rest.

When static comparison is performed, in some embodiments, the initial starting point is identifying common points of reference between implementations. Some examples of common points of reference would include string constants and the places in code that reference them, invocations of system calls or library routines that indicate a particular point in the protocol life cycle (such as a socket accept call on a listening socket), or manually identified object symbols or program addresses that refer to corresponding routines for processing particular parts of the protocol life cycle. Manually identified object symbols or program addresses may be provided by a user of a static comparison tool who has located the functions in two different programs that process the same protocol message, for example. Similar call or function flow graphs can also be an indicator of commonality between routines in two different programs subject to static analysis. Complex functionality may require that certain messages be implemented by the use of more complicated call graphs, for example if the proper response to a message requires many conditional clauses to determine an appropriate answer. When call graphs or execution flow graphs are both large and have an identical or very similar in structure the likelihood is greater than those graphs implement similar functionality. In order to determine when a call graph is similar in structure, a technique such as graph kernels may be used to compute an inner product that allows a quantification of the similarity between graphs.

In various embodiments, multiple implementations of a particular behavior on a same host may be compared in order to identify differences which may be relevant from a security perspective. In some embodiments, such a host based deployment may include multiple implementations and a way to provide security isolation for each of the implementations.

Figure 2:
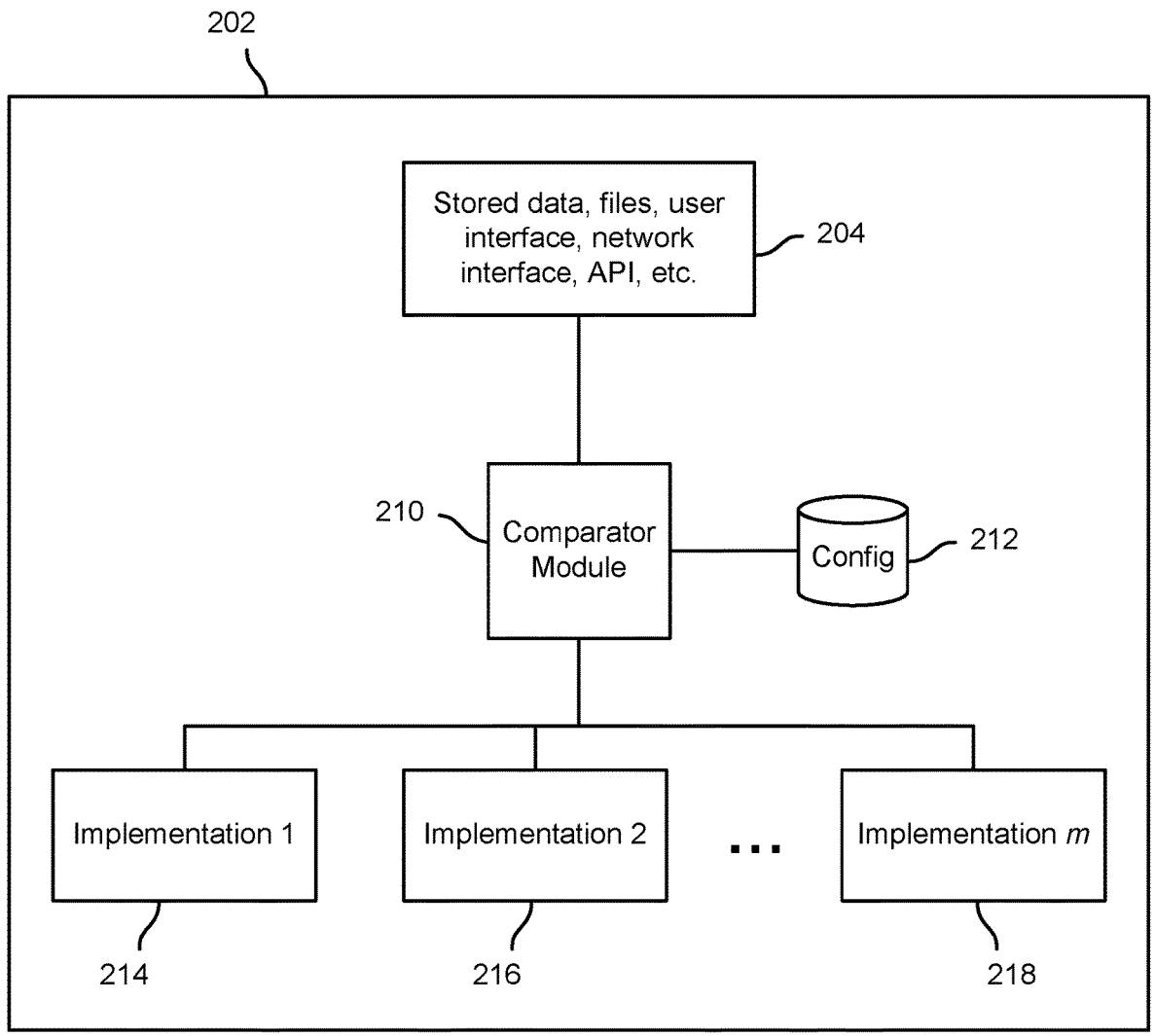
FIG. 2 is a block diagram illustrating an embodiment of a host based deployment of an implementation comparison-based security system.

FIG. 2 is a block diagram illustrating an embodiment of a host based deployment of an implementation comparison-based security system. In the example shown, a host computer system 202, such as a server or other computer, includes one or more resources and/or interfaces 204, e.g., stored data, files, user interface, network interface, API, etc., associated with a comparator module 210. Comparator module 210 may use configuration data 212 to process requests from and/or associated with resources and/or interfaces 204. Requests may be sent to each of a plurality of implementations selected from a set of implementations 1 through m on the host, represented in FIG. 2 by implementations 214, 216, and 218.

Providing security isolation between the implementations may ensure that a compromise of one of the implementations does not imply a compromise of the entire system. Security isolation between the implementations may be provided in a number of ways, such as virtual machines, containerization, or chroot jails. Multiple implementations of the same functionality may then be run in parallel and the output compared. In some embodiments, such techniques may be applied to implementations of network protocols such as TLS libraries or mail servers, to non-network code that implements identical functionality, etc. An example of this could be multiple implementations of photo or video viewing software that are given identical inputs. Behavior of the implementations can be compared to yield meaningful results. In this example, behavioral differences may include differences in the video or audio output created by each implementation or in their file system or network access patterns. Many tools such as per-container or per-process firewall rules may be implemented in order to provide for the security isolation discussed previously as well as to detect, contain, and control attacks when they occur.

Figure 3:
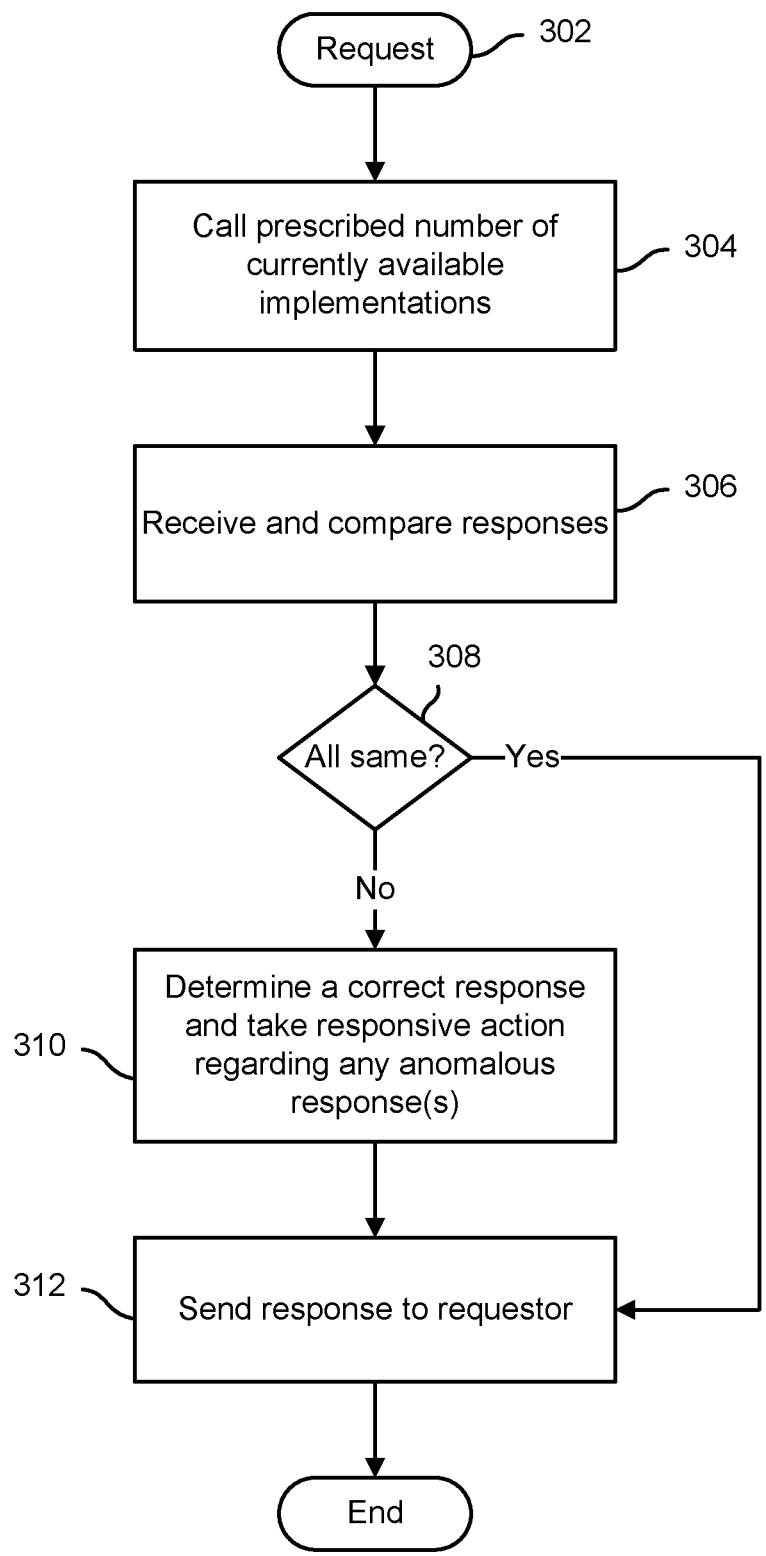
FIG. 3 is a flow chart illustrating an embodiment of a process to perform implementation comparison-based processing of requests.

FIG. 3 is a flow chart illustrating an embodiment of a process to perform implementation comparison-based processing of requests. In various embodiments, the process of FIG. 3 may be implemented by a comparator module, such as comparator module 110 of FIG. 1 or comparator module 210 of FIG. 2. In the example shown, when a request is received (302) a corresponding call is made to a prescribed number of currently available implementations (304). Responses from the respective implementations are received and compared (306). If the responses are all the same (308), a selected one of the responses is sent to the requestor from which the request was received (312). If the responses are not the same (308), a correct response (e.g., statistical mode response) is determined and sent to the requestor (310, 312) and responsive action is taken with respect to any anomalous (outlier) response(s) (310).

Figure 4:
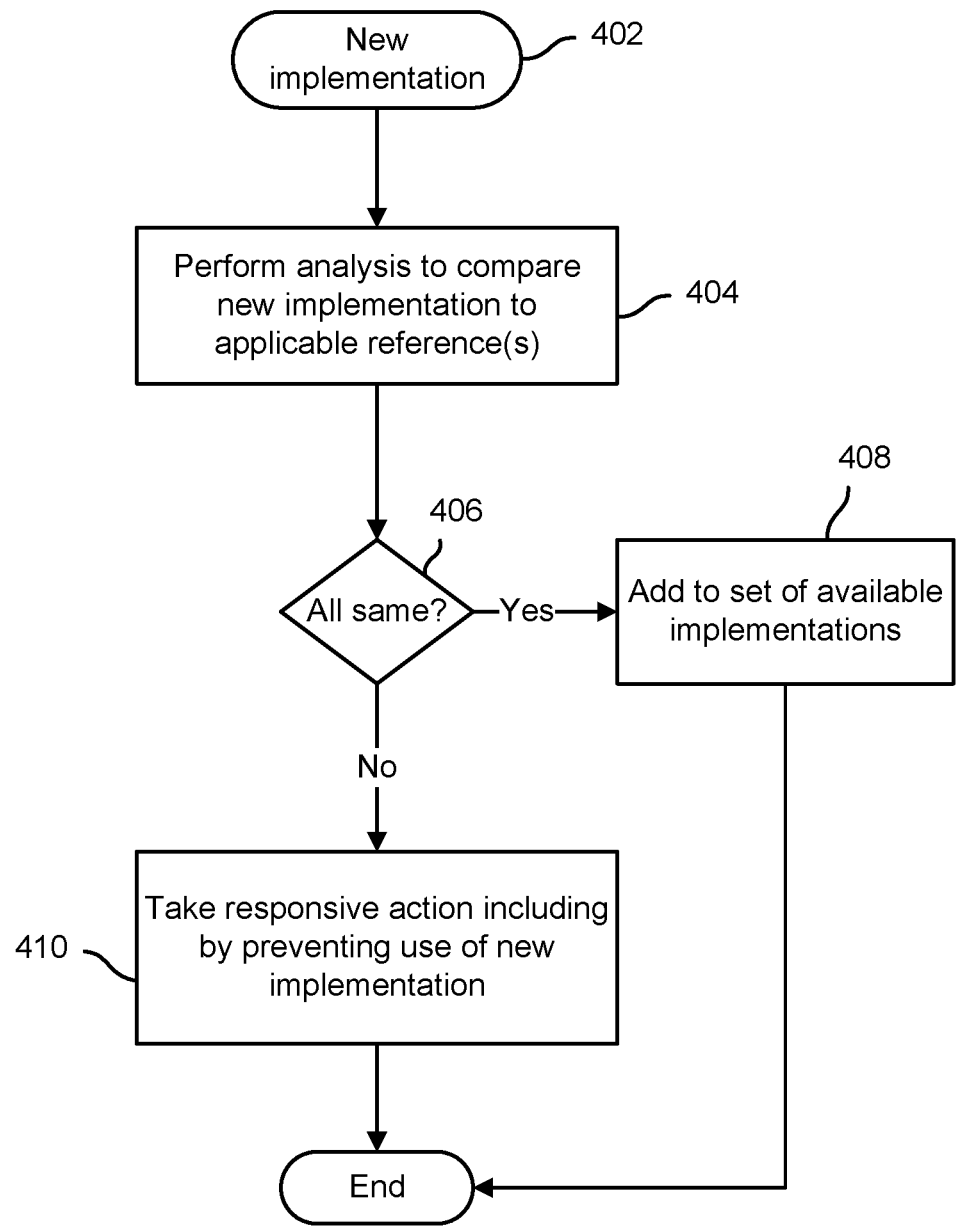
FIG. 4 is a flow chart illustrating an embodiment of a process to perform implementation comparison-based validation of a new implementation.

FIG. 4 is a flow chart illustrating an embodiment of a process to perform implementation comparison-based validation of a new implementation. In various embodiments, the process of FIG. 4 may be implemented by a comparator module, such as comparator module 110 of FIG. 1 or comparator module 210 of FIG. 2. In the example shown, when an indication is received that a new implementation (402) of an application, service, standard, etc. is available to be used, e.g., an software update or patch has been applied, etc., an analysis is performed to compare the new implementation to applicable reference(s) (404). For example, one or more existing implementations observed to have been behaving as expecting (e.g., producing responses that conform to other implementations), or a pre-update version of the same implementation, etc., may be used as a reference. A test and/or actual request may be processed by sending associated calls to both the newly-available implementation and the reference implementation(s). If the responses received from the respective new and reference implementations are the same (406), the new implementation is added to a set of currently available implementations (408). If the results are not the same, e.g., if the new implementation produces an outlier response (406), responsive action is taken, including by preventing use of the new implementation (410).

Figure 5:
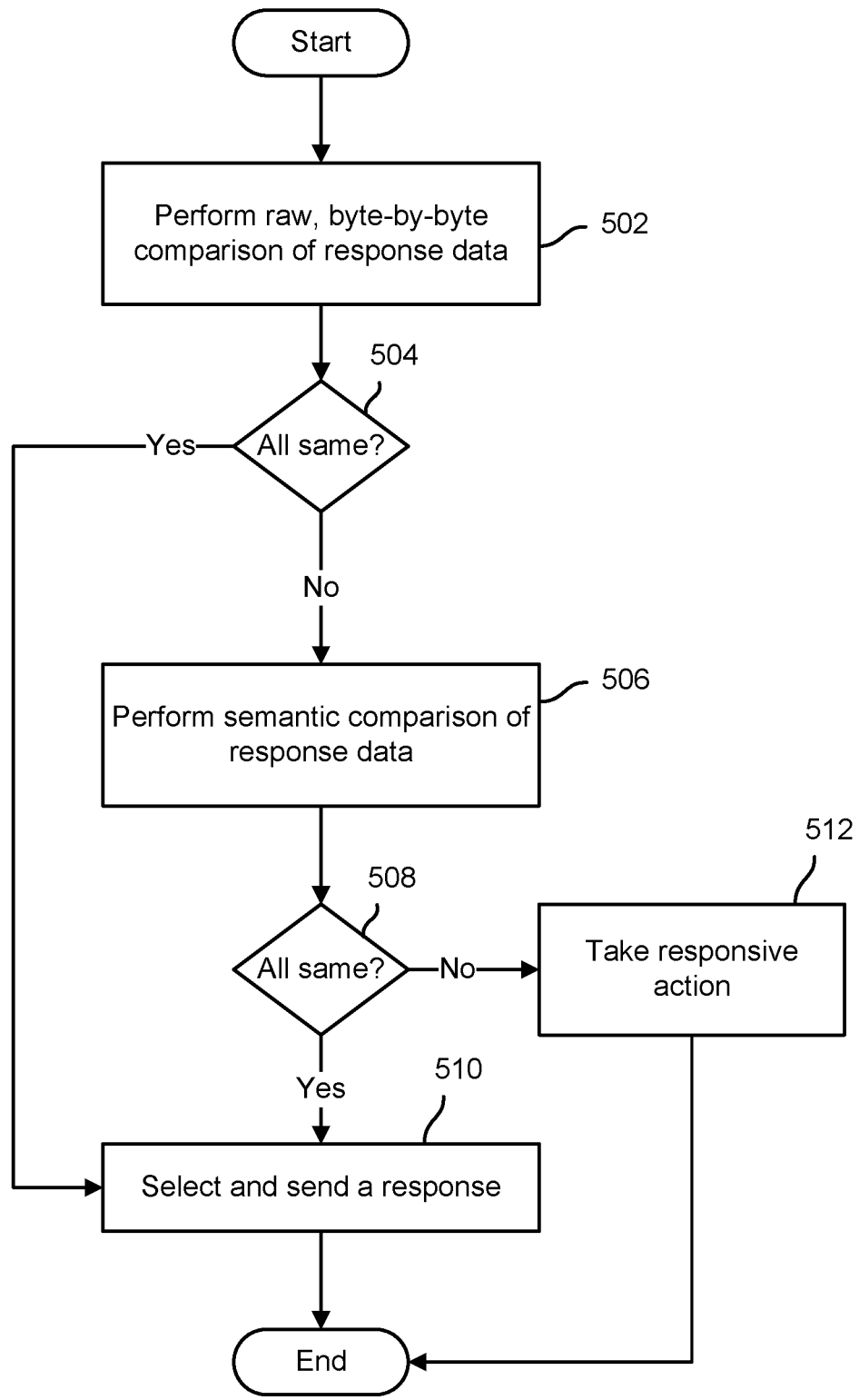
FIG. 5 is a flow chart illustrating an embodiment of a process to compare responses received from multiple implementations.

FIG. 5 is a flow chart illustrating an embodiment of a process to compare responses received from multiple implementations. In various embodiments, the process of FIG. 4 may be implemented by a comparator module, such as comparator module 110 of FIG. 1 or comparator module 210 of FIG. 2.

In some embodiments, implementations may be compared at least in part by actually running them and directly comparing the outputs for equality. The interface may be any computer code interface such as an API, ABI, RPC, or network protocol. What it means to intercept the inputs and outputs or requests and responses of the interface varies depending on the kind of interface in question. For example, an interface to a software library may be intercepted by hooking library functions and the inputs and outputs then represent the function parameters and return values. In the case of a network protocol such as SMTP, HTTP, TLS, or others the interface would be intercepted by receiving network traffic from clients and acting as an intermediary with the various implementations before sending a response.

The simplest way to compare data is a raw comparison of the traffic. In some embodiments, when a request is received, an identical request is sent to all chosen implementations. The response of each implementation is received and is then compared in a direct byte-for-byte fashion. If the responses are not all identical then this can be identified and acted upon. In various embodiments, a single request from a user system may be multiplied. For example, an identical or possibly modified version of the request may be sent to different implementations.

In some embodiments, comparison may include comparing the semantic meaning of the interface rather than to compare the raw bytes. This means that the responses are compared in terms of the expected functional importance. One example of a semantic comparison is a comparison where two error codes with different detailed descriptions may be considered to match, but an error code and a success code would not be considered to match. Additionally, when an interface defines multiple classes of error codes it may be more useful to consider error codes to match only if they are from the same class of errors. Certain kinds of parameters may not be expected to match exactly, or may be considered to match if they are close but not identical. Examples of such a parameter could be a value representing the exact time and date when the server formed the response, or a value explicitly defined as random. In the case of a time and date response it may be desirable to consider the values as matching as long as they are closer than some administrator defined time difference. Random parameters may be useful to consider as matching in some cases as long as the lengths are the same.

In general, semantic comparison requires a level of interface-specific intelligence in order to compare the input and output values in terms of their semantic meaning or functional impact. Meaning or functional impact may be indicated at least in part by the history of messages related to a given session or by the network session's current state. For example, a network message have a certain content may have one meaning and/or functional impact if preceded by a first preceding message or sequence of messages and a different meaning and/or functional impact if preceded by some other preceding message or sequence of messages. In some cases, this approach does not necessarily need to distinguish a properly formatted from an improperly formatted message, but only needs to be able to identify an appropriate semantic comparison to perform in order to determine if and how the implementations differ. In the case of data for which the appropriate semantic comparison cannot be determined or when there are multiple possible options a fallback approach may be chosen by the administrator. The fallback approach may include options such as simply using a raw traffic comparison on the data in question, alerting an administrator to the event, and/or abandoning comparison and simply relaying client traffic directly to a single implementation for the duration of the client's session.

In the example shown in FIG. 5, a raw byte-by-byte comparison is performed first (502). If the responses are the same, in terms of the raw data being identical (504), a response is selected from among the responses and sent to the requestor (510). If the raw comparison does not indicate the responses are identical at the raw data level (504), a semantic comparison is performed (506). If the responses are determined to be the same, in terms of their semantic content and/or significance (508), a response is selected and sent (510). If the responses are determined to not be the same semantically (508), a responsive action is taken (512), such as generating an alert, blocking an implementation that provided an outlier response, etc.

Figure 6:
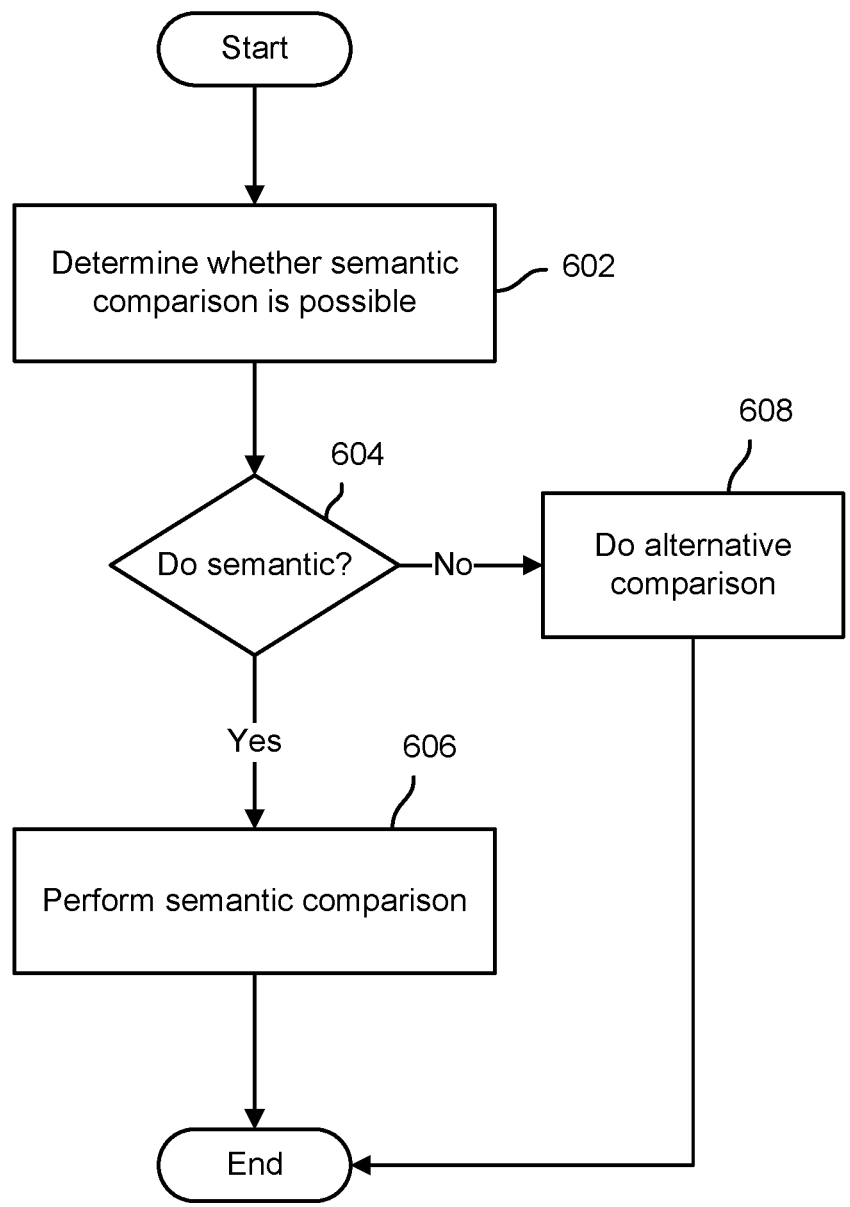
FIG. 6 is a flow chart illustrating an embodiment of a process to perform implementation comparison based processing.

FIG. 6 is a flow chart illustrating an embodiment of a process to perform implementation comparison based processing. In the example shown, a determination is made as to whether a semantic comparison of responses is possible (602). For example, a determination may be made as to whether drivers, protocol stacks, encryption keys, or other resources needed to extract semantic information from a response are available. If semantic comparison is possible (604), semantic comparison is performed (606). If semantic comparison is not possible (604), a fallback comparison, such as raw, byte-by-byte comparison, is performed (608).

Figure 7:
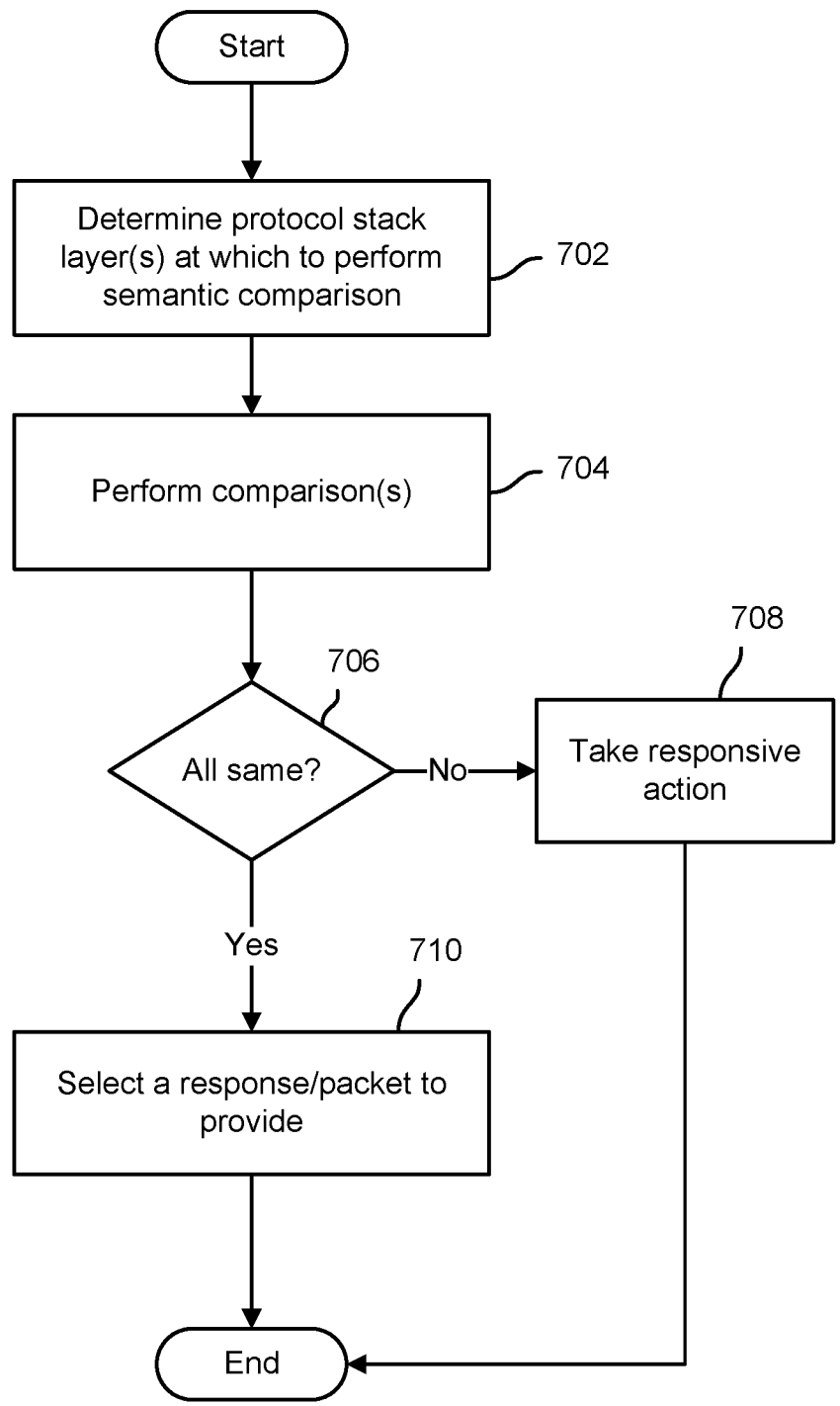
FIG. 7 is a flow chart illustrating an embodiment of a process to perform semantic comparison at one or more layers of a protocol stack.

FIG. 7 is a flow chart illustrating an embodiment of a process to perform semantic comparison at one or more layers of a protocol stack.

Many software interfaces interact as layers of functionality. In the case of a software library, one function call may include parameters that are then passed as a parameter to a function of another library. For a network protocol, this relationship can be understood as a layered protocol stack as exemplified by the ISO OSI model. One way to express this is that for a given protocol, the semantic meaning of some portion of its payload is defined by a different protocol. Because the relationships between these layers of the protocol stack may be somewhat dynamic and vary between different sessions it is helpful to have the ability to form arbitrary composite comparison operations on protocol stacks given a set of individual comparison operations on each protocol in the stack. One example of this composite activity might be with a secure web server using the protocols TCP, TLS, HTTP in a stack. In such a case, the TCP protocol comparisons can only be meaningfully applied at the TCP layer of the protocol stack. When TCP packets contain arbitrary data, a different protocol definition such as TLS or HTTP will be required in order to interpret that data. Similarly, TLS traffic includes both a portion of the traffic that has a meaning defined by the TLS protocol and arbitrary application data that might be interpreted by another protocol, such as HTTP or IMAP. The web server may also provide unencrypted web services on another port using only TCP and HTTP. With stacked comparison there may be a semantic comparison mechanism defined for each of the three protocols individually. Once the semantic comparison mechanism is available for each layer of the protocol stack, they can all be run in order to provide semantic comparison across the entire stack. Configurable options that may be set for any individual protocol can then be configured for each protocol stack in use. Having the implementations able to form arbitrary protocol stacks reduces the amount of development effort needed to support the variety of possible combinations of protocols. Additionally, the flexibility for users is increased since the combinations of defined protocols into different stacks can be a configuration change.

In the example shown in FIG. 7, responses received from a plurality of implementations are compared by first determining the protocol stack layer(s) at which semantic comparison is to be performed (702). For example, the system may be configured to perform semantic comparison at one or more configured or otherwise prescribed layers. Or, semantic comparison may be performed at all layers at which the resources and/or information required to perform such comparison are available. The determined comparison(s) is/are performed (704). If the responses are the same, semantically, at all layers are which semantic comparison is performed (706), a response is selected to be provided to the requestor (710). If the responses are not the same (706), responsive action is taken (708), such as by sending an alert, blocking an implementation associated with an outlier response, etc.

Some interfaces will require not simply making comparisons between the behaviors of different implementations, but there may be cases where the comparator itself must perform some of the activities typically associated with the service provider. An example of this is the TLS protocol in cases where an ephemeral session key is negotiated using a secure key exchange method. In order to decode the higher level protocols it is necessary for the server to be able to decode the traffic, which requires the server participate in key negotiation itself with both the client and the servers. However, once this key negotiation is complete the decoded data can be compared via the semantic comparison methods discussed earlier, including passing some or all of the decoded data to another protocol in the stack.

Figure 8:
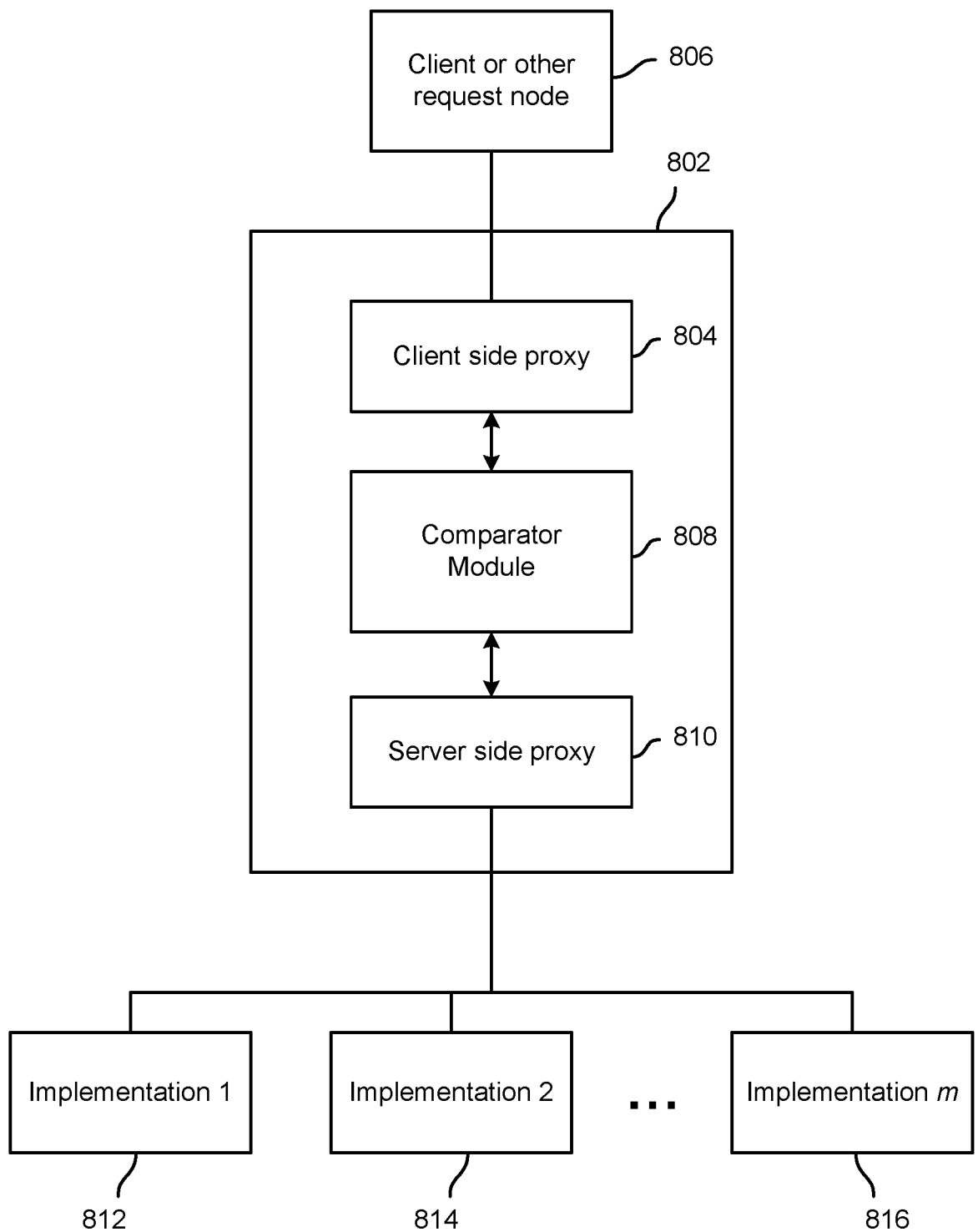
FIG. 8 is a block diagram illustrating an embodiment of a system configured to participate in a semi-active manner in interactions between a client and server, e.g., to perform implementation comparison-based processing of requests.

FIG. 8 is a block diagram illustrating an embodiment of a system configured to participate in a semi-active manner in interactions between a client and server, e.g., to perform implementation comparison-based processing of requests. In the example shown, a comparator node 802 includes a client side proxy 804 configured to terminate a connection from a client or other request node 802. The connection may be terminated on behalf of, e.g., by emulating, a server to which the client or other request node may be configured to connect. The client side proxy 804 may be configured to exchange session keys and/or otherwise fulfill requirements to communicate securely with the client or other request node 806. Client side proxy 804 may be configured to decrypt or otherwise provide access to content comprising a request received from the client or other request node 806, and to provide the request content to comparator module 808. Comparator node 802 also includes a server side proxy 810 configured to establish a connection with each of a plurality of implementations, selected from a set of available implementations 1 through m, represented in FIG. 8 by implementations 812, 814, and 816. For example, server side proxy 810 may be configured to receive from comparator module 808 an indication of a set of implementations to which a request is to be sent, and to establish on behalf of the request client 806 a corresponding connection with each implementation. The server side proxy 810 may be configured to provide to comparator module 808 responses received from the respective implementations to which a request was sent, and to perform implementation comparison-based processing as disclosed herein, e.g., by performing semantic comparison at one or more protocol stack layers. In some embodiments, a selected response may be sent to the client or other request node 806 via client side proxy 804.

Figure 9:
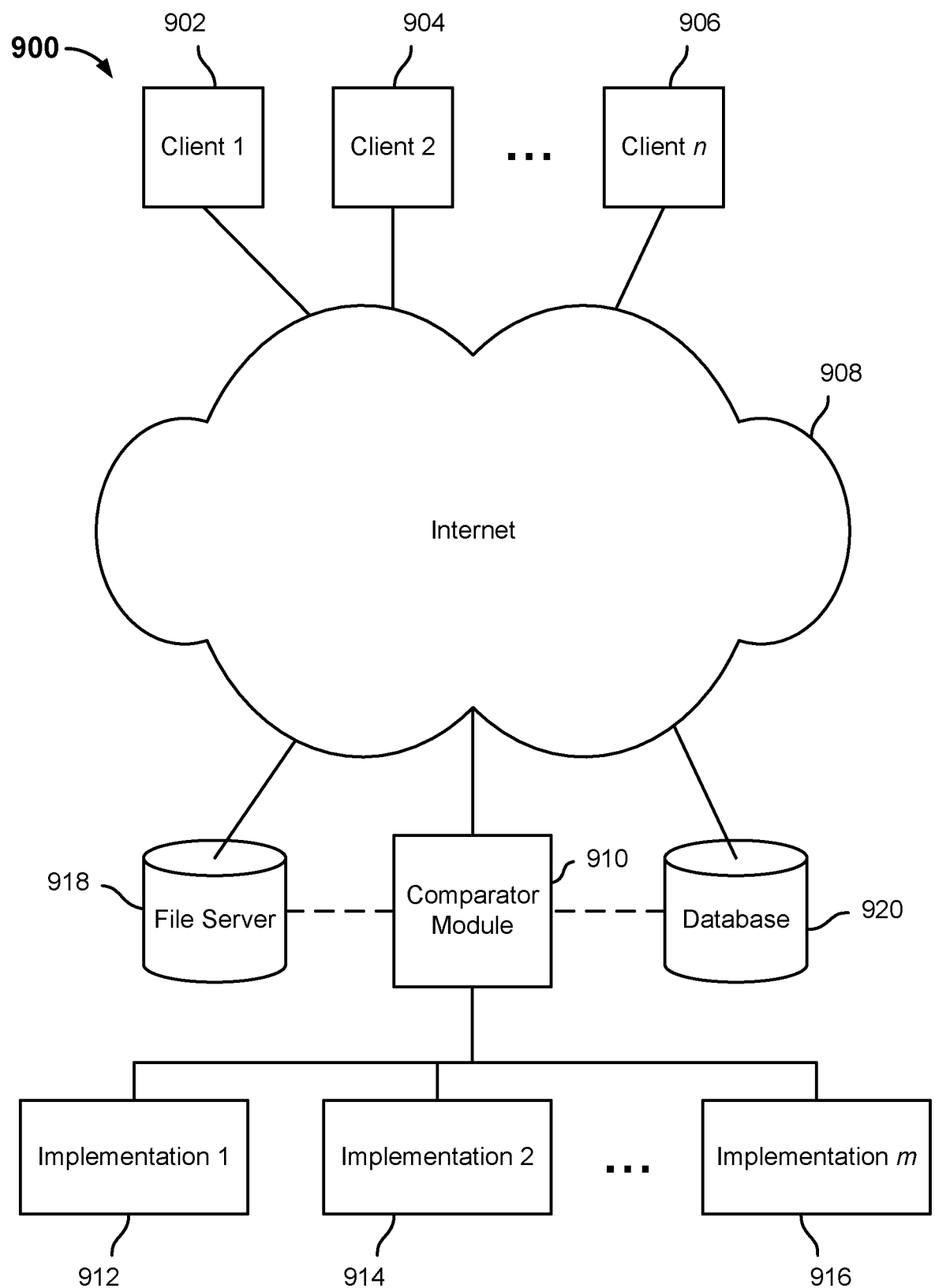
FIG. 9 is a block diagram illustrating an embodiment of a system to perform implementation comparison-based process to determine a correct output.

FIG. 9 is a block diagram illustrating an embodiment of a system to perform implementation comparison-based process to determine a correct output. In some cases, it may be useful to have the multiple outputs compared to provide more than one single output. As an example, a comparison may be performed by deploying multiple virtual machines with different implementations of the TLS and HTTP protocols. Since there is only one client in a given session, that single client is one of the single outputs of the comparison. However, there may be other single outputs that are a result of other comparisons as well. Elaborating upon the example, consider a situation where the client's interaction with the web server is intended to result in modifications to a database and storage of bulk data on a file server. If there is only a single database server and a single file server then each of them will need a single output which can be generated as the result of the comparison of the outputs of each of the implementations. Thus, there would be a protocol stack accepting TCP connections and passing the TLS and HTTP contents to the various implementations, comparing the responses to the client and presenting a single experience to the client depending on the configuration of the comparison rules. There would also be a protocol stack comparator configured to accept a set of connections from each of the compared implementations. This could then compare the requested database activity and use comparison rules to determine when the inputs should be passed along to the single database server. A similar comparison would apply to the file server access from each of the servers. Often it will be desirable for the single outputs other than the client to be mechanisms that enable persistence across client sessions. Other times, these outputs may be generated by on-going activity of the various implementations, such as those generated by time, throughput, or as indirect results of client activity. Since this persisted data may be sensitive, configuring conservative comparison rules such as only applying changes that are agreed upon unanimously provides a valuable protection. Additionally, having the persistence unified by means of a comparison among the outputs provides greater flexibility for using dynamic server pools since the servers that host the variety of implementations may be safely divested of any role in housing data that is sensitive or needs to be synchronized with mutable data housed by alternative implementations.

In the example shown in FIG. 9, computing environment 900 includes a plurality of clients 1 through n, represented in FIG. 9 by clients 902, 904, and 906, connected via the Internet 908 to a comparator module 910. Comparator module 910 is connected to a plurality of available implementations 1 through m, represented in FIG. 9 by implementations 912, 914, and 916. Requests from clients 902, 904, 906 may result in changes being made to one or both of files store in file server 918 and database records in database 920. In various embodiments, comparator module 910 may be configured to send a request to multiple implementations 912, 914, 916. Responses may include outputs associated with updates to files on file server 918 and/or database records in database 920. The responses are compared, and based on the comparison a single output is provided, as applicable, to one or both of file server 918 and database 920. An associated response may be sent to the requesting client.

In various embodiments, one or more of load balancing, fail over, and other common operational methods to ensure availability in the case of failure. For example, a large site that uses load balancing over an existing server pool may introduce a comparator module along with its various implementations as just one of the many servers in the existing pool. Any server pool managed by the comparator module may be independent of the preexisting server pool. In this case, a failure of the comparator module can be handled similarly to the way that failures of other servers in the pool are handled. Another example would be a deployment similar to a typical fail-over model, where the comparator and its server pool may be the primary server but in case of failure operations can be quickly or even automatically switched to a different server. The backup server may or may not be one of the servers in the server pool used by the comparator.

Figure 10:
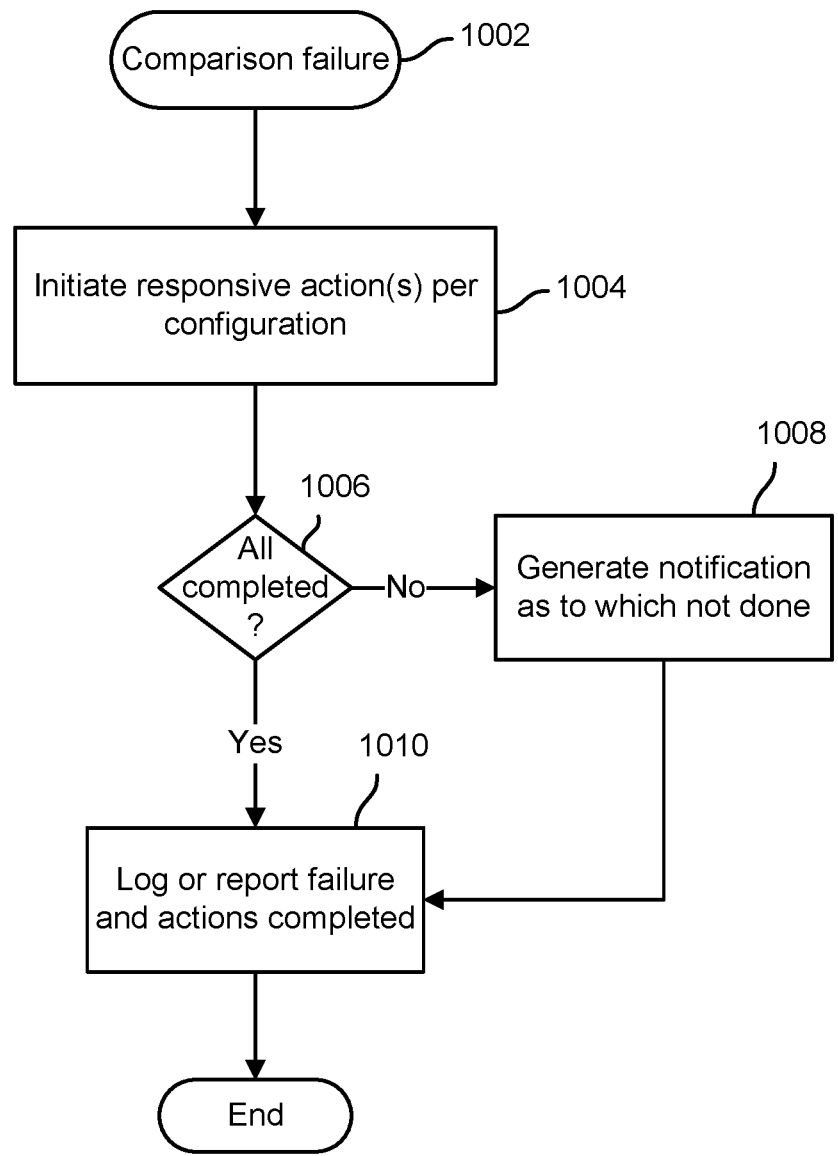
FIG. 10 is a flow chart illustrating an embodiment of a process to perform responsive action associated with a comparison failure.

FIG. 10 is a flow chart illustrating an embodiment of a process to perform responsive action associated with a comparison failure. In the example shown, if a comparison of responses from multiple implementations fails, i.e., one or more responses are not the same as the others (1002), responsive action is initiated (1004). For example, for each failure a corresponding responsive action indicated by configuration data may be initiated, such as sending an alert or other report, blocking access to an implementation, logging an event, etc. If any responsive action(s) cannot be completed (1006), a notification as to which action(s) could not be completed, indicating the affected implementation(s), is generated (1008). If all responsive actions are completed successfully (1006), or once a notification of a failed responsive action has been sent (1008), the results of the comparison and responsive action(s) taken and/or which failed to be completed are logged or otherwise reported (1010) and the process ends.

Figure 11:
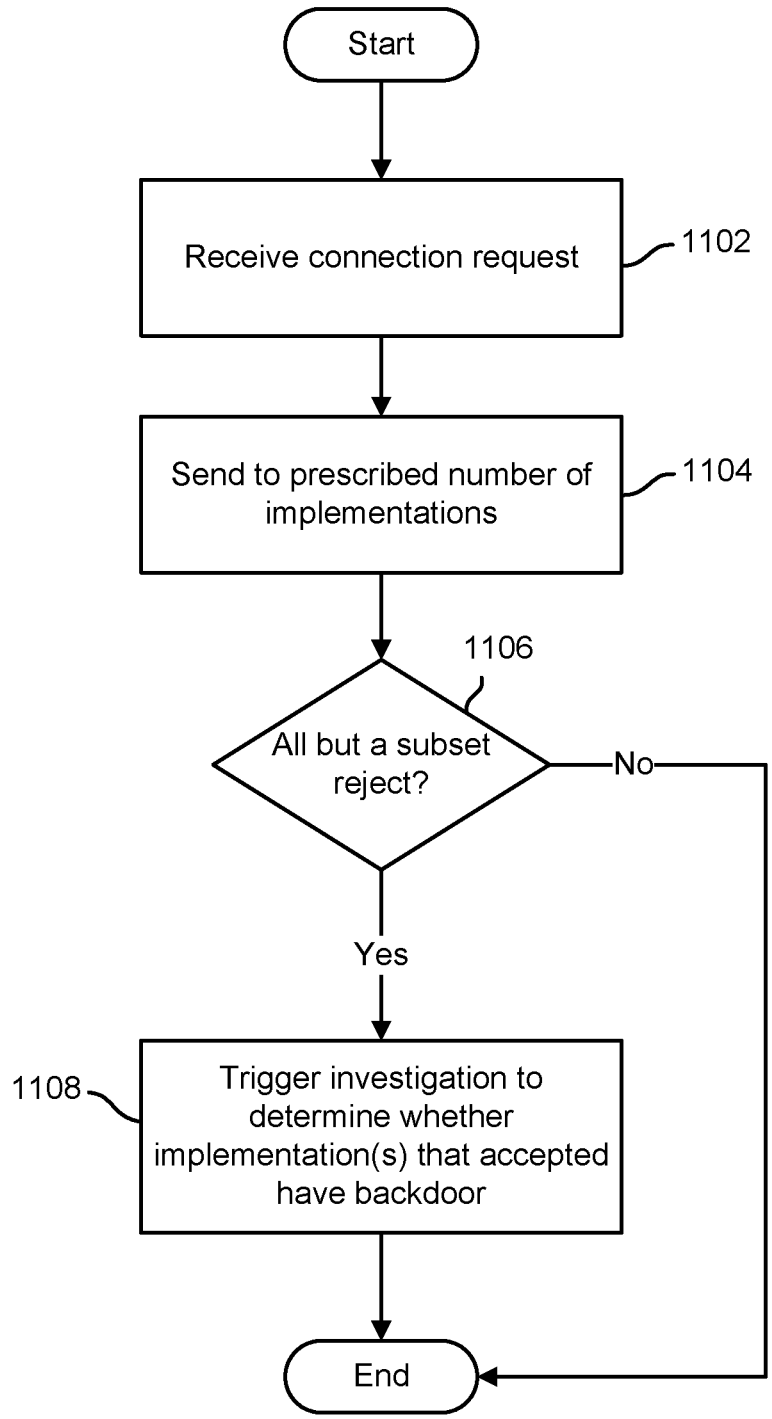
FIG. 11 is a flow chart illustrating an embodiment of a process to use implementation comparison techniques as disclosed herein to detect "back door" vulnerabilities.

FIG. 11 is a flow chart illustrating an embodiment of a process to use implementation comparison techniques as disclosed herein to detect "back door" vulnerabilities.

When an existing server has been offering a service prior to the deployment of a comparator, it may be used as one of the servers in the comparator's pool. Since the other servers in the pool will generally be cleanly installed they will be unlikely to have the same back doors or other malicious software that may have been installed by a past intruder. As a result, any behavior of the system that is due to the preexisting malicious software will be identified as unusual since it will differ from the behavior of the cleanly installed systems. In this case, the protocol comparison may occur at a lower level protocol such as IP, UDP, or TCP. An example of a semantic difference that may happen in the case of a backdoor is that traffic to a particular TCP or UDP port may be ignored or rejected by the newly installed servers, but accepted as a valid connection by the compromised server. A deployment for the purposes of detecting existing back doors will generally be focused on identifying and learning about servers that have already been compromised, rather than for the purpose of preventing attacks and learning about new attackers and vulnerabilities. A single deployment may be configured to provide multiple benefits, such as by configuring the protocol comparison to occur both at high and low levels of the protocol stack. Likewise, the server pool may be configured to include the potentially compromised server among the many possible alternative implementations that may be chosen.

In the example shown in FIG. 11, a connection request is received (1102). A corresponding call is sent to a prescribed number of implementations (1104). If all but a subset of the implementations reject the connection request, but one or more of the implementations accept the request (1106), an investigation or other responsive action is triggered to determine whether the implementation(s) that accepted the request has an unauthorized back door installed (1108). If all the implementations either accept or reject the request unanimously (1106), the process of FIG. 11 ends without further action.

In various embodiments, techniques disclosed herein may be used to detect emerging vulnerabilities, e.g., as new implementations are deployed. The security processing may be hidden from the view or experience of benign clients, and vulnerabilities hidden from potentially malicious clients.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a processor coupled to the communication interface and configured to:
use a protocol stack accepting TCP or UDP connections and passing contents to each implementation in a pair of implementations;
receive from each implementation in the pair of implementations a network message, the network messages received from the respective implementations comprising a related set of network messages;
compare the respective network messages received from the implementations in the pair of implementations at least in part by performing a byte by byte comparison of raw data comprising the network messages, to determine a correct response based at least in part on configuration of comparison rules for the protocol stack and for the related set of network messages; and
determine a responsive action based at least in part on the correct response in the event there is a difference between a particular network message from the pair of implementations.

2. The system of claim 1, wherein the respective network messages each comprises a response to a request sent to each of the implementations in the pair of implementations.

3. The system of claim 2, further comprising receiving the request and sending to each of a pair of implementations a corresponding communication determined based at least in part on the request.

4. The system of claim 1, wherein the communication interface comprises one or more of a network interface, an application programming interface, and a user interface.

5. The system of claim 1, wherein the communication interface comprises an internal interface of a host on which at least a subset of implementations comprising said pair of implementations are deployed.

6. The system of claim 1, wherein the pair of implementations comprises a subset of a set of available implementations and the processor is configured to determine the subset.

7. The system of claim 1, wherein the processor is configured to compare the respective network messages at least in part by determining a semantic content of each of said network messages and comparing the semantic content.

8. The system of claim 7, wherein the semantic content is determined at least in part by one or more previous network messages.

9. The system of claim 7, wherein the semantic content is determined at least in part by a current network session state of a network session with which the network messages are associated.

10. The system of claim 1, wherein the processor is configured to compare the respective network messages at one or more protocol stack layers comprising or otherwise associated with each network message.

11. The system of claim 1, wherein the processor is further configured to determine, based at least in part on the comparison, a response to be provided to a requestor associated with the request.

12. The system of claim 1, wherein the processor is configured to participate actively in an interaction between the client and said pair of implementations.

13. The system of claim 12, wherein the active participation includes terminating a connection with one or both of said client and said pair of implementations.

14. The system of claim 12, wherein the active participation includes exchanging with the client one or more keys required to access content data comprising the request.

15. The system of claim 1, wherein the request comprises a connection request, the mode response comprises a rejection of the connection request, and the processor is further configured to identify an implementation that accepted the connection request for further evaluation to determine whether a backdoor vulnerability is present.

16. A method, comprising:
using a protocol stack accepting TCP or UDP connections and passing contents to each implementation in a pair of implementations;
receiving from each implementation in the pair of implementations a network message, the network messages received from the respective implementations comprising a related set of network messages;
comparing the respective network messages received from the implementations in the pair of implementations at least in part by performing a byte by byte comparison of raw data comprising the network messages, to determine a correct response based at least in part on configuration of comparison rules for the protocol stack and for the related set of network messages; and
determining a responsive action based at least in part on the correct response in the event there is a difference between a particular network message from the pair of implementations.

17. The method of claim 16, wherein the respective network messages each comprises a response to a request sent to each of the implementations in the pair of implementations.

18. A computer program product embodied in a non-transitory computer readable medium and comprising computer instructions for:
using a protocol stack accepting TCP or UDP connections and passing contents to each implementation in a pair of implementations;
receiving from each implementation in the pair of implementations a network message, the network messages received from the respective implementations comprising a related set of network messages;

comparing the respective network messages received from the implementations in the pair of implementations at least in part by performing a byte by byte comparison of raw data comprising the network messages, to determine a correct response based at least in part on configuration of comparison rules for the protocol stack and for the related set of network messages; and determining a responsive action based at least in part on the correct response in the event there is a difference between a particular network message from the pair of implementations.

* * * * *

UNITED STATES PATENT AND TRADEMARK OFFICE
CERTIFICATE OF CORRECTION

PATENT NO. : 10,986,119 B2  
APPLICATION NO. : 16/543412  
DATED : April 20, 2021  
INVENTOR(S) : Robert F. Ross Page 1 of 1

It is certified that error appears in the above-identified patent and that said Letters Patent is hereby corrected as shown below:

In the Specification

In Column 5, Line(s) 59, before "software", delete "an" and insert --a--, therefor.

In Column 9, Line(s) 64, delete "store" and insert --stored--, therefor.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*